United States Patent [19]
Lebar et al.

[11] Patent Number: 5,106,048
[45] Date of Patent: Apr. 21, 1992

[54] SUPPORT STANDS

[76] Inventors: Matthew Lebar, 42 Gracey Blvd., Etobiocke, Ontario, Canada, M9R 2A3; Martin Lebar, 9 Renova Drive, Etobicoke, Ontario, Canada, M9C 3E8

[21] Appl. No.: 631,234

[22] Filed: Dec. 20, 1990

[51] Int. Cl.⁵ ............................................. A47B 97/04
[52] U.S. Cl. .................................. 248/460; 248/167; 248/188.6
[58] Field of Search ............... 248/460, 462, 166, 167, 248/168, 169, 440.1, 188.6, 188.7, 125, 161; 211/195, 196, 203, 204

[56] References Cited

U.S. PATENT DOCUMENTS

| | | |
|---|---|---|
| 949,157 | 2/1910 | Partenheimer . |
| 1,060,861 | 5/1913 | Schulte ................. 248/167 |
| 1,974,012 | 9/1934 | Busby ................. 248/460 X |
| 2,046,134 | 6/1936 | Ryang . |
| 2,544,615 | 3/1951 | Raymond ............. 248/167 |
| 3,199,825 | 8/1965 | Bellows ............... 248/171 X |
| 3,708,144 | 1/1973 | Nasmith ............... 248/167 |
| 4,165,856 | 8/1979 | Wiseheart . |
| 4,355,779 | 10/1982 | Heled ................. 248/460 |
| 4,407,182 | 10/1983 | Biasini . |
| 4,605,193 | 8/1986 | Kuparinen . |
| 4,606,525 | 8/1986 | Lombardi ............ 248/460 |
| 4,607,897 | 8/1986 | Schwartz ........... 248/188.7 X |
| 4,629,150 | 12/1986 | O'Callaghan ........ 248/177 X |
| 4,634,090 | 1/1987 | Currie . |
| 4,674,415 | 6/1987 | Smith ............... 248/188.7 X |
| 4,819,902 | 4/1989 | Wenger et al. . |

Primary Examiner—J. Franklin Foss
Attorney, Agent, or Firm—Rogers, Bereskin & Parr

[57] ABSTRACT

A support stand including three upright, cylindrical lower support legs, each leg having a foot extending perpendicularly of the lower end of the leg. The stand further includes two vertically spaced connecting blocks having aligned linearly arranged apertures for receiving the legs, with the upper block mounted over the upper ends of the legs. The two outer legs are rotatably mounted in the blocks to permit the outer legs to be rotated to move the respective feet between a storage position, with the feet substantially aligned and extending perpendicularly of the blocks, and the support position with the feet splayed apart. An upright, cylindrical upper support leg is provided for mounting a support for a book, or piece of equipment such as a microphone and is telescopicaly received within the center leg.

21 Claims, 2 Drawing Sheets

SUPPORT STANDS

FIELD OF THE INVENTION

This invention relates to improvements in support stands, and in particular, to collapsible or folding support stands for use in supporting sheet music, papers, microphones and other objects.

BACKGROUND OF THE INVENTION

Support stands are often used by singers and musicians to support sheet music in an easily visible location to be followed while singing or playing. For transport and storage most stands are collapsible or fold down to a more compact configuration. A stand will typically be provided with an upright support leg provided with feet extending outwardly of the leg. The feet may fold or pivot from a support configuration, in which the feet are splayed apart, to a storage configuration in which one or more of the feet are folded or rotated to lie close to the support leg, such as disclosed in U.S. Pat. No. 4,819,902 issued Apr. 11, 1989 to Wenger et al. In other arrangements the feet may be rotated to lie parallel to other support feet, such as disclosed in U.S. Pat. No. 4,605,193 issued Aug. 12, 1986 to Kuparinen, or the feet may be pivotally mounted to the leg and be brought into alignment with the leg, such as disclosed in U.S. Pat. No. 4,355,779 issued Oct. 26, 1982 to Heled. A sheet holder provided with only two support feet is disclosed in U.S. Pat. No. 2,046,134 issued June 30, 1936 to Ryang, in which the feet may be aligned parallel with the support leg in the storage configuration. All of the above mentioned stands further include a telescopic arrangement of the support leg with a book or sheet holder being pivotally attached to the upper end of the support leg.

Further examples of collapsible stands are disclosed in U.S. Pat. No. 4,165,856 issued Aug. 28, 1979 to Wiseheart, U.S. Pat. No. 4,407,182 issued Oct. 4, 1983 to Biasini and U.S Pat. No. 4,634,090 issued Jan. 6, 1987 to Currie et al. Further, U.S. Pat. No. 949,157 issued Feb. 15, 1910 to Partenheimer discloses an ash tray provided with three legs provided with inwardly extending studs which are pivotally mounted to vertically spaced blocks, two of the legs being pivotally mounted to the blocks to permit the legs to be folded into a more compact storage arrangement.

SUMMARY OF THE INVENTION

In one aspect of the present invention there is provided a support stand including three substantially upright support legs, each leg having a foot extending laterally of the lower end of the leg. Two vertically spaced connecting members are provided and define aligned apertures for receiving the legs. At least two of the legs are rotatably mounted in the connecting members to permit the legs to be rotated to move the respective feet between a storage position, with the feet substantially aligned, and a support position, with the feet splayed apart.

Preferably, at least one of the connecting members includes means for limiting the range of rotation of the rotatably mounted legs between the storage position and an optimum support position. For a stand provided with three legs, the optimum support position would typically be with the feet splayed 120° apart. For this purpose one or both of the connecting members may include pins which extend into slots provided in the legs. For a three-legged stand, the slots would typically extend over 120°.

Preferably also, each foot extends substantially perpendicularly from the respective leg. This provides a stand with a slim profile which is therefore less likely to be accidentally knocked or tripped over.

The connecting members are preferably in the form of blocks defining linearly arranged apertures. Most preferably, the support legs are circular in cross-section and the linearly arranged apertures of the blocks are of complementary shape. In the preferred embodiment, the blocks are formed of a plastic material and provide a smooth bearing surface for the legs in the apertures.

To permit adjustment of the force required to rotate the legs between the storage and support positions one of the connecting members may include clamping means for clamping the legs in the member. Where the connecting members are in the form of blocks, the clamping means may act on the outer walls of one of the blocks and is preferably in the form of a screw passing through the centre aperture of the lower block. To facilitate clamping and to increase the compressibility of the block, a slot may extend between the apertures and the centre aperture may be larger than the outer apertures.

An upper, upright support leg for mounting a book support and the like may be provided and may be telescopically received in the centre leg. Means may be provided for clamping the upper leg in the centre leg. The clamping means may be provided in the upper block. Most preferably, the upper end of the centre support leg is split and the upper block receives a threaded pin for engaging the outer surface of the leg to compress the leg and grip the upper support leg.

A book support may be pivotally mounted on a mounting block at the upper end of the upper support leg. The book support may include a mounting bracket having two plates adapted to be received in complementary slots in the mounting block, the mounting block being provided with clamp means to clamp the plates in the slots. The provision of two plates and two complementary slots provides sufficient friction between mounting block and the mounting bracket such that the book support may be pivoted between positions by hand without adjustment of the clamp means.

In a second aspect of the present invention there is provided a support stand including three upright, cylindrical lower support legs, each leg having a foot extending perpendicularly of the lower end of the leg. The stand further includes two vertically spaced connecting blocks having aligned, linearly arranged apertures for receiving the legs, with the upper block mounted over the upper ends of the legs. The two outer legs are rotatably mounted in the blocks to permit the outer legs to be rotated to move the respective feet between a storage position, with the feet substantially aligned and extending perpendicularly of the blocks, and the support position with the feet splayed apart. An upright, cylindrical upper support leg is provided for mounting a support for a book, or piece of equipment such as a microphone and is telescopically received within the centre leg.

BRIEF DESCRIPTION OF DRAWINGS

These and other aspects of the present invention will now be described, by way of example, with reference to the accompanying drawings, in which.

DETAILED DESCRIPTION OF DRAWINGS

Figures 1, 2:
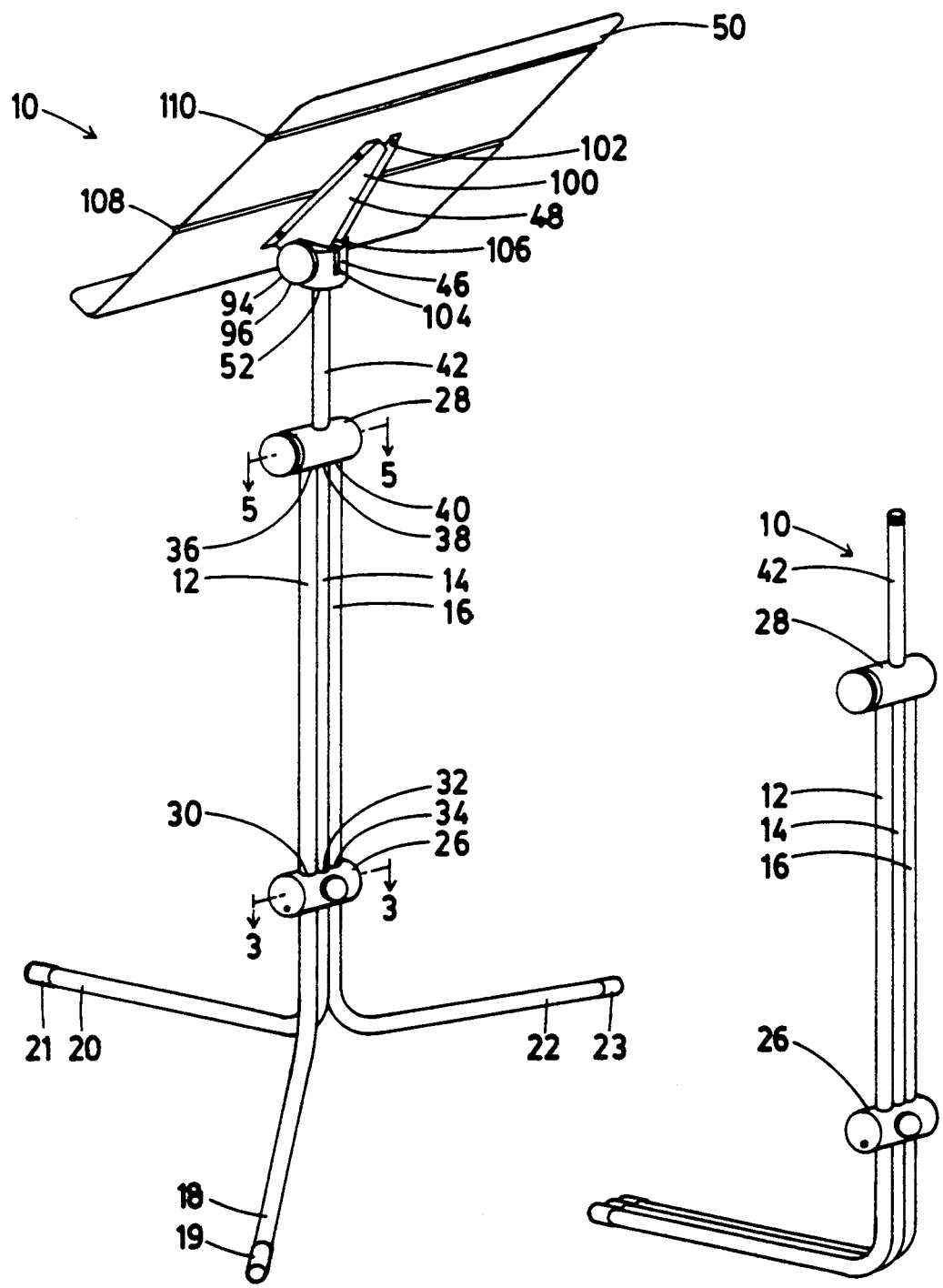
FIG. 1 is a perspective view of a support stand in accordance with a preferred embodiment of the present invention, the support stand being shown in a support configuration and provided with a book support.
FIG. 2 is a perspective view of the stand of FIG. 1, shown in a storage configuration.

Reference is first made to FIG. 1 of the drawings, which shows a support stand 10 in accordance with a preferred embodiment of the present invention. The stand 10 is shown in the support position, ready to support, for example, sheet music or lecture notes. As will be described, the stand 10 may also be configured in a more compact storage configuration, as illustrated in FIG. 2 of the drawings.

The stand includes three substantially upright, lower support legs 12, 14, 16 each leg having a foot 18, 20, 22 extending laterally from the lower end of the leg. In the preferred embodiment, each leg and foot is formed of a single tubular metal member bent at right angles to provide the perpendicular foot, with a resilient end cap 19, 21, 23 being fitted to the end of each foot.

The legs 12, 14, 16 are maintained in a parallel arrangement by two connecting members in the form of blocks 26, 28 provided with aligned apertures 30, 32, 34, 36, 38, 40 for receiving the legs. The apertures in each block 26, 28 are arranged linearly such that the legs 12, 14, 16 are maintained in a side-by-side arrangement.

The two outer legs 12, 16 are rotatably mounted in the blocks 26, 28 and are moveable from a support configuration, as illustrated in FIG. 1, with the feet 18, 20, 22 splayed 120° apart, to a storage configuration, as shown in FIG. 2, with the feet 18, 22 aligned in parallel with the fixed, centre foot 20 which extends perpendicularly of the block 26.

An upper support leg 42 is telescopically received by the centre, lower support leg 14, passing through the upper block 28, and is provided with a mounting block 46 for pivotally engaging a mounting bracket 48 fixed to the rear of a book support 50. The upper end of the support leg 42 is threaded for engaging a corresponding threaded aperture 52 in the base of the mounting block 46, such that the book support 50 may be removed from the leg 42 for storage.

Figure 3:
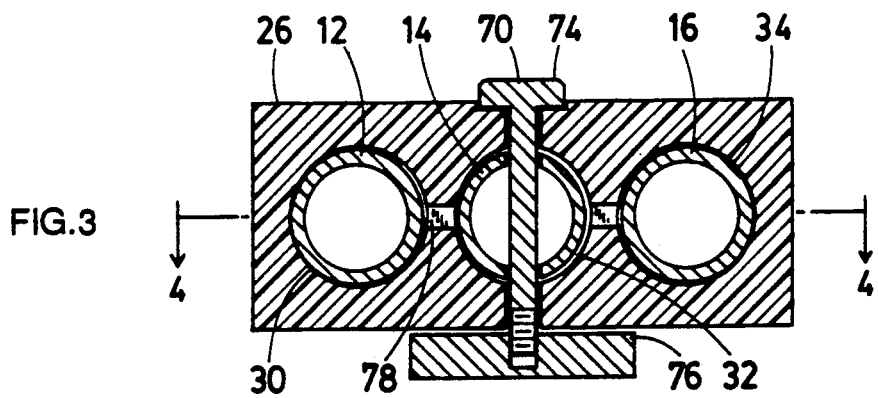
FIG. 3 is a sectional view on line 3—3 of FIG. 1.
Figure 4:
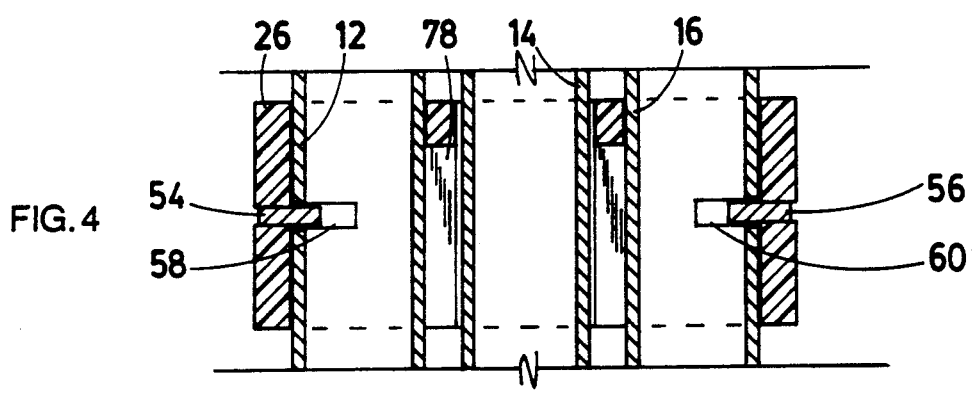
FIG. 4 is a sectional view on line 4—4 of FIG. 3, and showing a complete section.

Further details of the stand 10 will now be described with reference also to FIGS. 3 through 6. FIGS. 3 and 4 illustrate the lower block 26 in which, as described above, the centre leg 14 is fixed and the outer legs 12, 16 may be rotated. The degree of rotation of the legs 12, 16 is limited by the provision of pins 54, 26 which extend through the ends of the block 26 into slots 58, 60 provided in the legs 12, 16. In this particular example, the slots extend 120° around each leg 12, 16 to permit 120° of rotation and thus providing stops for the legs at the support and storage configurations. A similar arrangement is provided in the upper block 28, with pins 62, 64 (FIG. 5) being provided to engage slots 66, 68 in the upper ends of the legs 12, 16. The pins in the blocks 26, 28 also serve to retain the legs 12, 16 in the blocks.

To adjust the level of force required to rotate the legs 12, 16 in the blocks, clamping means in the form of a hand adjustable clamping screw 70 is provided for clamping the outer walls of the block 26 to grip the legs 12, 16 in the apertures 30, 34. The screw 70 has a flat head 74 on one side or the block 26 and is provided with a knurled nut 76 on the opposite side of the block. To facilitate compression of the block 26 a slot 78 extends between the apertures 30, 32, 34. However, the slot 78 does not extend to the upper surface of the block 26, as may be seen in FIG. 4, to preserve the smooth appearance of the block. The screw 70 is located in the centre of the block and extends through the centre leg 14. As the clamping action of the screw 70 is intended to operate on the outer legs 12, 16, the central aperture 32 is made slightly larger than the outer apertures 30, 34.

Figure 5:
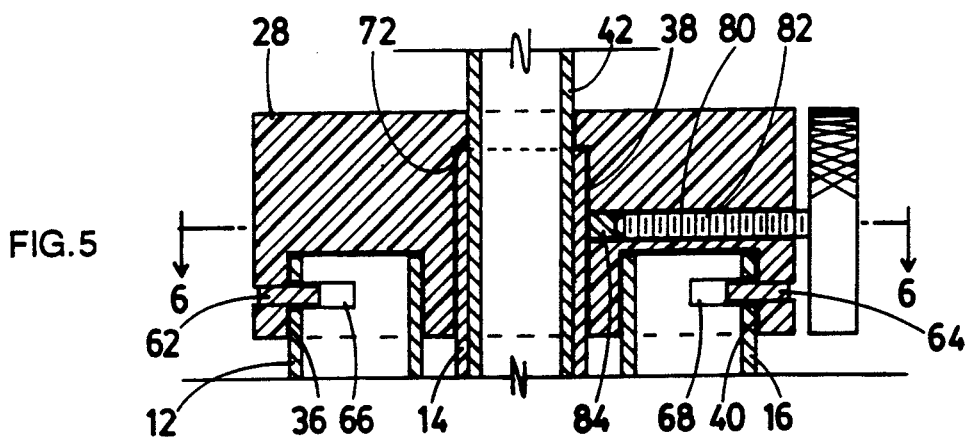
FIG. 5 is a sectional view on line 5—5 of FIG. 1.
Figure 6:
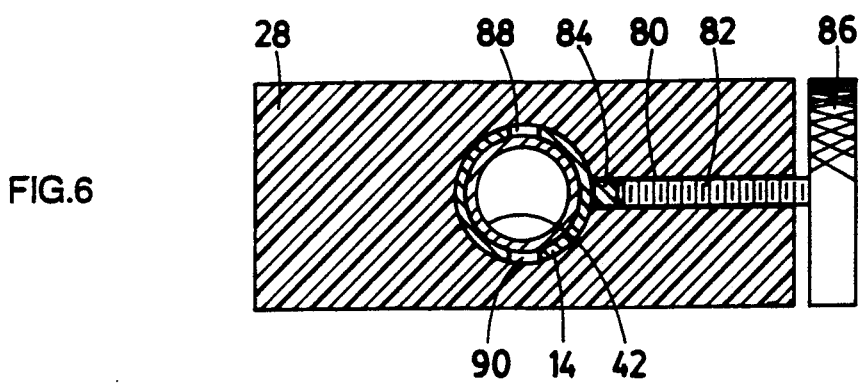
FIG. 6 is a sectional view on line 6—6 of FIG. 5, and showing a complete section.

Reference is now made to FIGS. 5 and 6 of the drawings, which illustrate details of the upper block 28. As mentioned above, the upper block includes provision for rotatably receiving the upper ends of the outer legs 12, 16, which are received in blind apertures 36, 40 formed in the lower portion of the block 28. The centre leg 14 extends somewhat further through the block 28, to just below the upper surface where a stop 72 is formed by the aperture 38 being stepped inwardly to form a smaller diameter upper opening, of complementary diameter to the upper support leg 42. As may be seen from FIG. 5, the outer diameter of the upper support leg 42 is complementary to the inside diameter of the tubular leg 14.

To lock the upper support leg 42 relative to the lower part of the support 10, a hand operated screw 82 is provided and extends through a threaded aperture 80 from one end of the block 28. In the preferred embodiment, a brass spacer 84 is provided between the end of the screw 82 and the side of the leg which the screw acts against. The screw is provided with a knurled head 86 to facilitate hand rotation of the screw. To facilitate compression of the upper end of the leg 14, opposing slots 88, 90 are provided through the leg walls, as may be seen most clearly in FIG. 6 of the drawings.

As was mentioned above, the upper end of the upper support leg 42 is threaded for engaging the mounting block 46 (FIG. 1) which provides a pivotal mounting for the book support 50. A screw 94 provides the pivotal connection between the block and bracket 46, 48 and includes a knurled nut 96 which may be tightened or loosened to adjust the force required to pivot the book support in the block 46. The bracket 48 includes two plates 100, 102 which are located in complementary slots 104, 106 provided in the upper portion of the block 46. The two slots 104, 106 provide four surfaces for bearing against the plates 100, 102 and thus provide a degree of friction which maintains the book 50 in a desired orientation, but which allows an adjustment of the orientation without adjustment of the screw 94.

In the preferred embodiment the book support 50 and bracket 48 are formed of aluminium alloy sheet and the bracket 48 is riveted to the support 50. Stiffening ribs 108, 110 are provided in the support 50.

In the preferred embodiment as described, the legs 12, 14, 16, 42 are tubular and are formed of tubular aluminium alloy, the lower support legs 12, 14, 16 being formed of three-quarter inch diameter tubing, while the upper support leg 42 is formed of five-eights inch diameter tubing. The tubes are provided with an anodized finish which is hard-wearing, provides for sliding of the upper support leg within the centre lower support leg and provides for a smooth bearing surface between the rotatable legs and the blocks. To provide for a complementary bearing surface, and to allow for the deformation of the lower block 26, the blocks are formed of a suitable plastic material, most preferably polyethylene such as is sold under the trademark DELRIN. To minimize costs, and also to provide a pleasing appearance, the blocks are formed of cylindrical sections which may be machined to provide the desired apertures. The mounting block 46 is also preferably formed of similar polyethylene and is machined as appropriate.

To assure stable mounting of the block 46 on the upper end of the upper support leg 42, the threaded portion of the leg 42 is relatively long. Further, the aperture 52 in the base of the block 46 is formed slightly smaller than the leg 42, such that a thread is cut into the wall of the aperture 52 as the block is mounted on the leg 42 for the first time.

Although the above-described embodiment is in the form of a book support stand, the present invention may also be utilised to provide, for example, a microphone stand. For this application, the upper support leg 42 would be provided with an appropriate microphone mounting and, as microphone stands are generally of greater height than music stands, the upper support leg could be formed of a number of telescopically interconnected parts. A similar arrangement could be used to provide mounting for lamps and the like.

It will be clear to those skilled in the art that the above-described aspects and embodiments are merely exemplary of the present invention and that modifications and improvements may be made without departing from the scope of the present invention.

We claim:
1. A support stand comprising:
    (a) three substantially upright support legs, each leg having a foot extending laterally of the lower end thereof;
    (b) two vertically spaced connecting members defining aligned apertures for receiving the legs, at least two of the legs being rotatably mounted in the connecting members to permit said at least two legs to be rotated to move the respective feet between a storage position, where the feet are substantially aligned, and a support position, with the feet splayed apart, each of said two rotatably mounted legs having a slot extending part way around the leg; and
    (c) pins protruding from at least one of said connecting members and projecting into the slots for limiting the range of rotation of said rotatably mounted legs between the storage position and an optimum support position.
2. The support stand of claim 1, wherein both of the connecting members include portions for engaging the rotatably mounted legs to limit the rotation thereof.
3. The support stand of claim 1, wherein the support legs are circular in cross section.
4. The support stand of claim 1, wherein each foot extends substantially perpendicularly from the respective leg.
5. The support stand of claim 1, wherein the connecting members are each in the form of blocks defining linearly arranged apertures.
6. The support stand of claim 5, wherein the support legs are circular in cross section and the linearly arranged apertures of the blocks are of complementary shape.
7. The support stand of claim 1, wherein one of the connecting members includes clamping means for clamping the legs in the member to increase the force required to rotate the legs.
8. The support stand of claim 7, wherein the connecting members are each in the form of blocks defining linearly arranged apertures and the clamping means acts on the outer walls of one of the blocks.
9. The support stand of claim 8, wherein the clamping means is in the form of a screw passing through the centre aperture of the lower block.
10. The support stand of claim 9, wherein a slot extends between the apertures to increase the compressibility of the block.
11. The support stand of claim 10, wherein the centre aperture is larger than the outer apertures to further increase the compressibility of the block.
12. The support stand of claim 8, further comprising an upright upper support leg telescopically received in the centre leg.
13. The support stand of claim 12, wherein second clamping means is provided in the upper block for locking the upper support leg in the centre leg.
14. The support stand of claim 13, wherein the upper end of the centre support leg is split and the upper block includes a threaded pin for engaging the outer surface of said upper end to compress the leg and grip the upper support leg therein.
15. The support stand of claim 13, wherein the upper block is mounted to the upper end of the lower support legs, and a smaller diameter aperture is provided in the upper face of the block for receiving the upper support leg.
16. The support stand of claim 13, wherein a book support is pivotally mounted on a mounting block at the upper end of the upper support leg, the book support including a mounting bracket having two plates received in complementary slots in the mounting block, the mounting block being provided with clamp means to clamp the plates in the slots and thus increase the force required to rotate the mounting bracket.
17. A support stand comprising:
    (a) three upright, cylindrical lower support legs, each leg having a foot extending perpendicularly of the lower end thereof;
    (b) two vertically spaced connecting blocks having aligned, linearly arranged apertures for receiving the legs with the upper connecting block mounted over the upper ends of the legs, the two outer legs being rotatably mounted in the blocks to permit said outer legs to be rotated to move the respective feet between a storage position, with the feet substantially aligned and extending perpendicularly of the blocks, and a support position, with the feet splayed apart, each of said two rotatably mounted legs having a slot extending part way around the leg and;
    (c) an upright, cylindrical upper support leg telescopically received within the centre leg; and
    (d) pins protruding from at least one of said blocks and projecting into the slots for limiting the range of rotation of said rotatably mounted legs between the storage position and an optimum support position.
18. A support stand comprising:
    (a) three substantially upright support legs, each leg having a foot extending laterally of the lower end thereof;
    (b) two vertically spaced connecting blocks having aligned, linearly arranged apertures for receiving the legs, at least two of the legs being rotatably mounted in the connecting blocks to permit said at least two legs to be rotated to move the respective feet between a storage position, where the feet are substantially aligned, and a support position, with the feet splayed apart;
(c) a screw passing through the centre aperture of the lower block and acting on the outer walls of the lower block for clamping the legs in the block to increase the force required to rotate the legs; and
(d) a slot extending between the apertures to increase the compressibility of the block;
wherein the centre aperture is larger than the outer apertures to further increase the compressibility of the block.

19. A support stand comprising:
(a) three substantially upright support legs, each leg having a foot extending laterally of the lower end thereof;
(b) two vertically spaced connecting blocks having aligned, linearly arranged apertures for receiving the legs, at least two of the legs being rotatably mounted in the connecting blocks to permit said at least two legs to be rotated to move the respective feet between a storage position, where the feet are substantially aligned, and a support position, with the feet splayed apart;
(c) clamping means acting on the outer walls of one of the blocks for clamping the legs in the block to increase the force required to rotate the legs;
(d) an upright upper support leg telescopically received in the centre leg; and
(e) second clamping means provided in the upper block for locking the upper support leg in the centre leg;
wherein the upper end of the centre support leg is split and the upper block includes a threaded pin for engaging the outer surface of said upper end to compress the leg and grip the upper support leg therein.

20. A support stand comprising:
(a) three substantially upright support legs, each leg having a foot extending laterally of the lower end thereof;
(b) two vertically spaced connecting blocks having aligned, linearly arranged apertures for receiving the legs, at least two of the legs being rotatably mounted in the connecting blocks to permit said at least two legs to be rotated to move the respective feet between a storage position, where the feet are substantially aligned, and a support position, with the feet splayed apart;
(c) clamping means acting on the outer walls of one of the walls for clamping the legs in the members to increase the force required to rotate the legs;
(d) an upright upper support leg telescopically received in the centre leg; and
(e) second clamping means provided in the upper block for locking the upper support leg in the centre leg;
wherein the upper block is mounted to the upper end of the lower support legs, and a smaller diameter aperture is provided in the upper face of the block for receiving the upper support leg.

21. A support stand comprising:
(a) three substantially upright support legs, each leg having a foot extending laterally of the lower end thereof;
(b) two vertically spaced connecting blocks having aligned, linearly arranged apertures for receiving the legs, at least two of the legs being rotatably mounted in the connecting blocks to permit said at least two legs to be rotated to move the respective feet between a storage position, where the feet are substantially aligned, and a support position, with the feet splayed apart;
(c) clamping means acting on the outer walls of one of the walls for clamping the legs in the members to increase the force required to rotate the legs;
(d) an upright upper support leg telescopically received in the centre leg; and
(e) second clamping means provided in the upper block for locking the upper support leg in the centre leg;
wherein a book support is pivotally mounted on a mounting block at the upper end of the upper support leg, the book support including a mounting bracket having two plates received in complementary slots in the mounting block, the mounting block being provided with clamp means to clamp the plates in the slots and thus increase the force required to rotate the mounting bracket.

* * * * *